Figure 1:
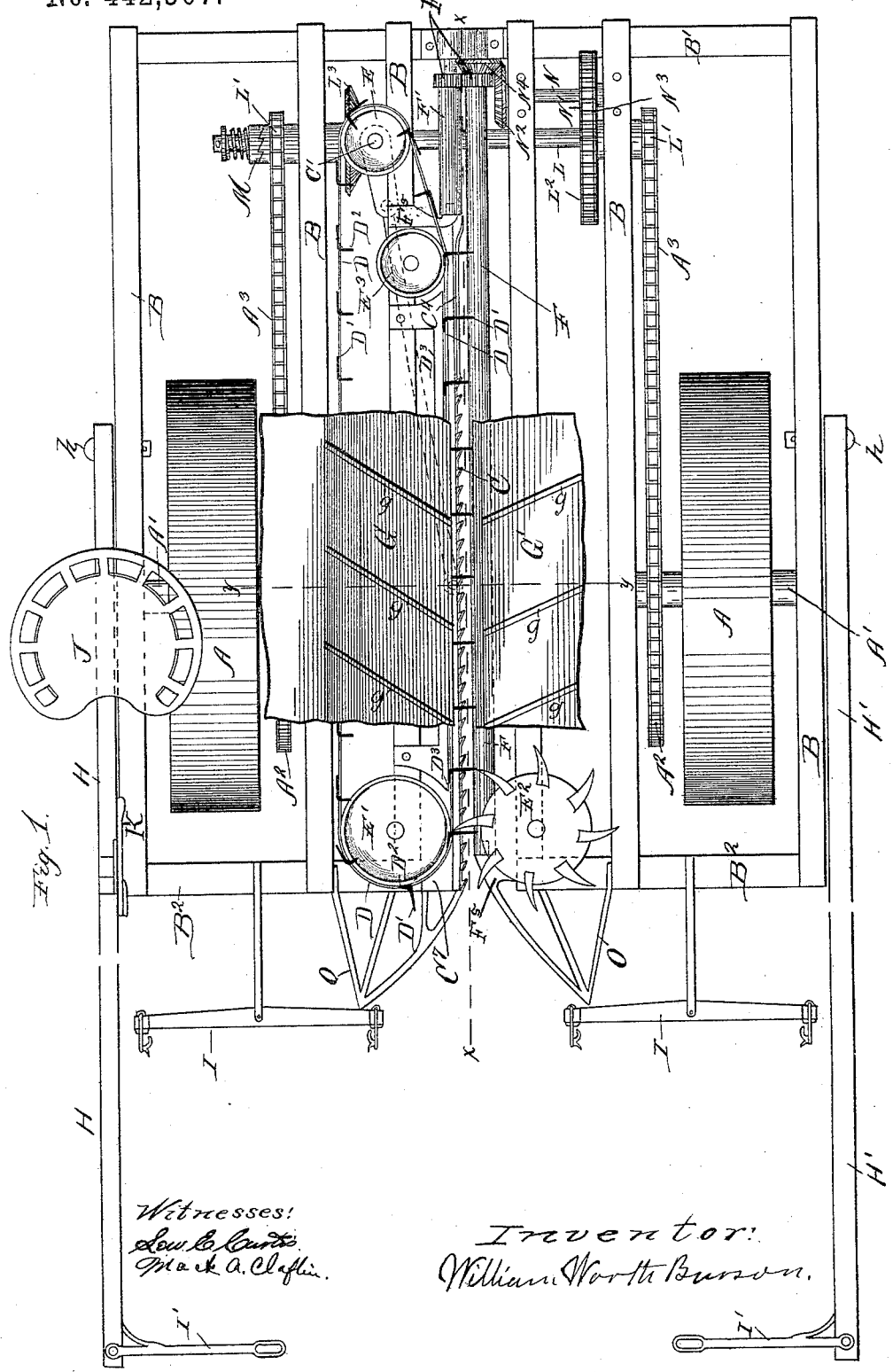

(No Model.) 2 Sheets—Sheet 1.

W. W. BURSON.
CORN HARVESTER.

No. 442,307. Patented Dec. 9, 1890.

Witnesses:
Lew. E. Curtis
Mark A. Claflin

Inventor:
William Worth Burson (No Model.) 2 Sheets—Sheet 2.
W. W. BURSON.
CORN HARVESTER.
No. 442,307. Patented Dec. 9, 1890.
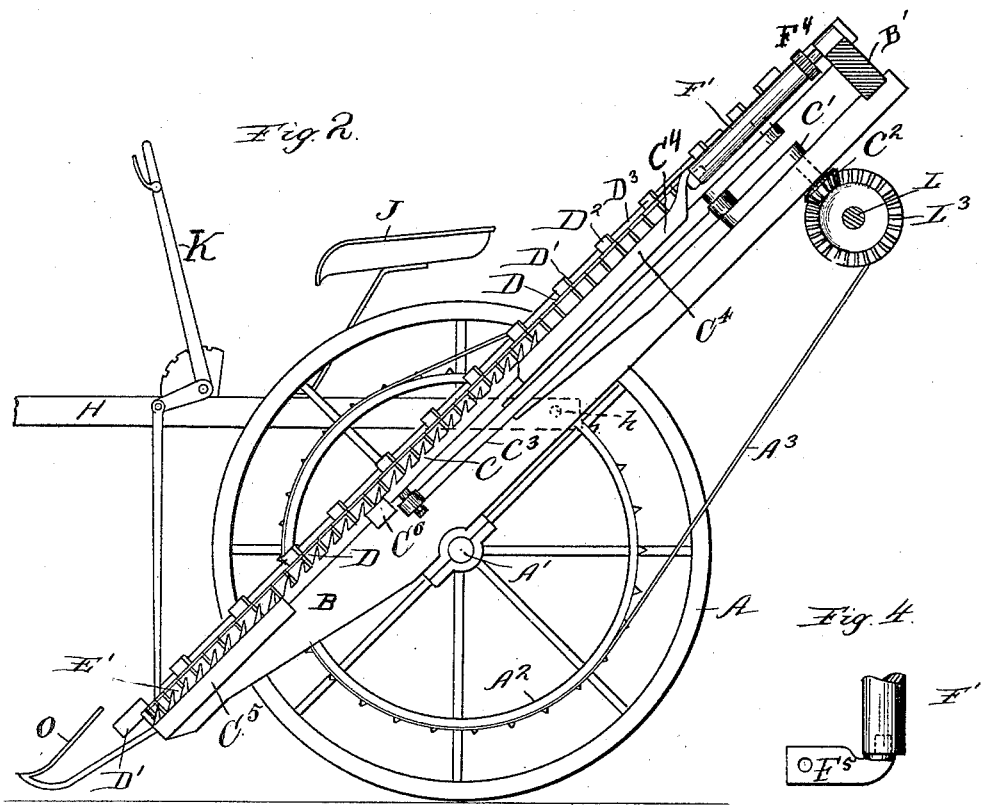
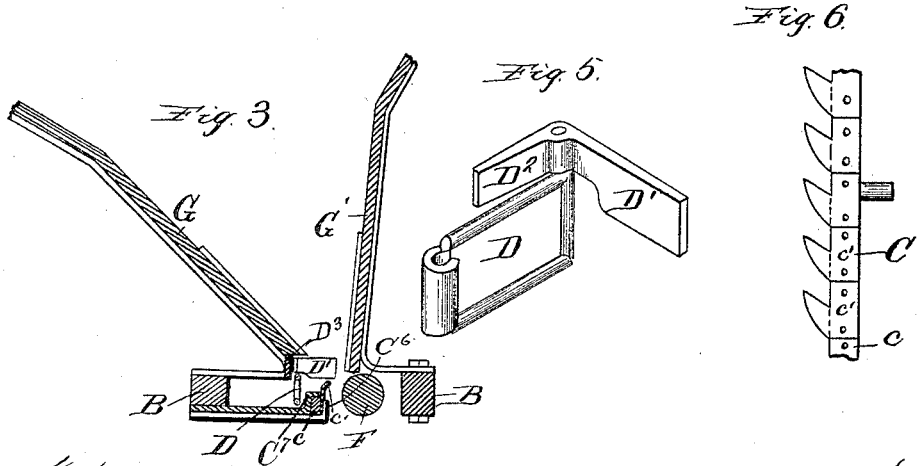
Witnesses:
Sav. E. Curtis.
Mack A. Claflin.
Inventor:
William Worth Burson.
THE NORRIS PETERS CO., PHOTO-LITHO., WASHINGTON, D. C.

UNITED STATES PATENT OFFICE.

WILLIAM WORTH BURSON, OF CHICAGO, ILLINOIS.

CORN-HARVESTER.

SPECIFICATION forming part of Letters Patent No. 442,307, dated December 9, 1890.

Application filed April 8, 1889. Serial No. 306,296. (No model.)

*To all whom it may concern:*

Be it known that I, WILLIAM WORTH BURSON, a citizen of the United States, residing at Chicago, in the county of Cook and State of Illinois, have invented certain new and useful Improvements in Corn-Harvesters, of which the following is a specification.

My improvement relates to corn-harvesters, and more especially to stripping the ears from the stalks; and the objects of my improvements are, first, to provide a more effective stripping mechanism than has heretofore been made; second, to facilitate the gathering of the stalks into the stripping mechanism, and other improvements which will be herein described. I attain these objects by the mechanism illustrated in the accompanying drawings, in which—

Figure 1 is a top view of the machine viewed at right angles to the inclination of the frame. Fig. 2 is an elevation in section of Fig. 1 on the line $x$ $x$, certain parts being omitted the better to show others. Fig. 3 is a section of the stripping mechanism on the line $y$ $y$, Fig. 1. Fig. 4 shows the forward bearing of the stripping-rollers. Fig. 5 shows a link of chain D, with its gathering-tooth D'. Fig. 6 shows part of stripping-bar C.

In the drawings similar letters refer to similar parts throughout the several views.

The driving-wheels A A are fixed rigid to their shafts A' A', upon which are supported by proper bearings the frame-pieces B. This frame in the present construction consists of the parallel pieces B B, connected at their rear ends by the cross-beam B', extending across the machine, and by the short beams $B^2$ $B^2$, which connect their forward ends, leaving a stalk-passage between them. On one side of this stalk-passage is placed the stripper-bar C, supported in proper guides, and also the toothed gathering and elevating chain D, which is driven by the sprocket-wheel E at the upper or rear end of the stalk-passage, and at the lower or forward end of the stalk-passage passes around the sprocket E', which, in connection with the gathering-wheel $E^2$, operates to bring the stalks into the stalk-passage. On the side of the stalk-passage opposite the stripper-bar is placed the roller F, extending the entire length of the stalk-passage, and at the upper end of the stalk-passage on the same side with the stripper-bar is placed roller F'. On the stripper-bar side of the stalk-passage is placed the inclined side-board G and on the opposite side the board G', partly seen in Fig. 1 in plan and in section in Fig. 3.

The double tongues H H' are pivoted to the outside frame-pieces B at $h$ $h$, and at their forward ends are pivoted the arms I' I', to which the breast-straps are attached. These arms are pivoted so as to swing freely forward, but are prevented from coming backward past a right angle by the brace shape, as shown in Fig. 1. Upon tongue H is conveniently placed the driver's seat J, and in proper relation thereto is the tilting lever K, connecting the forward end of the machine with the tongue, the construction being of the usual form and its operation so well understood that no detailed description is needed here.

The driving mechanism consists of the sprocket-wheel $A^2$ upon shaft A', on which is the chain $A^3$, which gives movement to the sprocket L' upon shaft L, the chain and sprocket wheels being in duplicate for each driving-wheel A. One sprocket L' should have a ratchet-clutch M, Fig. 1. The sprocket $L^2$ and bevel-gear $L^3$ are fastened on shaft L. Meshing in bevel-gear $L^3$ is pinion $C^2$ on the lower end of crank shaft C', and on the upper end of the shaft is the sprocket E, which operates chain D. Shaft N has upon one end a sprocket N' and on the other a bevel-gear $N^2$. A chain $N^3$ connects sprocket $L^2$ on shaft L with sprocket N' on shaft N. Bevel-gear $N^2$ meshes in pinion $N^4$ upon the shaft of roller F. The spur-pinions $F^4$ on the shafts of rollers F and F' give motion to roller F'. Pitman $C^3$ connects the crank of the shaft C' with stripper-bar C, giving an endwise-reciprocating motion thereto. The teeth of chain D engage with the teeth of wheel $E^2$, and the stalks are jointly engaged by the chain and wheel, by which the wheel receives its movement.

I have omitted from my present application certain parts which are shown in my application filed October 28, 1886, Serial No. 217,481, which this application is intended in part to supersede, such as the carrier to deliver the gathered ears into a wagon driven alongside of the machine, a chute to guide the ears into the elevator, a cover for the operating-gearing to protect them from the stalks and rubbish, an evener for the whiffletrees, and other things which are not claimed in this application, but are important in a working-machine.

Having described the general construction of my machine, I shall now explain more definitely some of its parts.

The stripper-bar C is conveniently made by riveting the teeth $c'\ c'$ upon a bar $c$. The teeth $c'\ c'$ are hooked backward, so as to engage the ears or their stems when drawn backward and to pass by them easily when moving forward, Fig. 6. This stripper-bar is held in a guideway at one side of the stalk-passage, the teeth projecting upward nearly vertical, but preferably inclining slightly toward the stalks. It is given an endwise-reciprocating movement in the manner clearly shown in Figs. 1 and 2. At the rear end of the stripper-bar the guide-plate $C^4$ is made of such form as to guide the stalks into the passage between the rollers F F' and to act as a stationary stripping-plate when bar C is at its forward stroke, whereby the ears are stripped from the stalks on the return-stroke of the stripper-bar. At the lower end of the stalk-passage is the guide-plate $C^5$, which serves the purpose of a stationary stripping-plate on the upward stroke of the stripper-bar C, Fig. 2. About midway between the guide-plates $C^4$ and $C^5$ is the guide-piece $C^6$, Fig. 2. The retaining guide-plate $C^7$, Fig. 3, covers the bar $c$ throughout the entire stripper-bar passage, leaving the teeth only of said bar projecting above said guide.

The gathering-rods O O pass along close to the ground—one on either side of the stalk-passage—and extend outwardly far enough to guide all the stalks into the stripping mechanism, assisted by the toothed chain D, passing around the wheel E', and by the toothed wheel $E^2$, which is turned by its teeth engaging with the teeth of chain D. The tooth D' is pivoted on the upper edge of the link of chain D, and its foot $D^2$ holds the tooth in operative position along the stalk-passage by pressing against the guide-track $D^3$, which also forms a guide for chain D. The tooth D' has sufficient vertical width to serve as an elevator for the ears when stripped from the stalks and operates to pass the ears and stalks along the stalk-passage.

The side-board G, located on the stripper-bar side of the stalk-passage, is inclined so as to permit all the ears broken from the stalks to slip down upon the chain and be elevated to the rear of the machine. The more effectually to insure the ears being guided upon the carrying-chain the cleats $g\ g$ are placed upon the side-boards G G', Fig. 1, which prevent the ears slipping down the endwise incline of the boards and guide them to the chain.

The side-board G', located on the roller side of the stalk-passage, differs from side-board G in this, that it is nearly vertical for some distance above the roller and then inclines outward to catch ears accidentally broken from the stalks. This construction of the side-board G' is made to force the ears, which are always of greater diameter than the stalks at their junction therewith, over into contact with the stripper-bar, the teeth of which will engage them or their stems and jerk them from the stalks.

The side-boards G G' extend from the rear end of the stalk-passage to the front end and far enough on each side to catch and save the ears broken from the stalks in any manner in the operation of gathering the corn. The front ends are beveled and tapered, so as not to hinder leaning stalks from entering the stalk-passage and being operated upon by the stripping mechanism.

In the construction of machine here shown roller F is used as a resistant member on the side of the stalk-passage opposite the stripper-bar C to hold the stalks in operative position to the stripper-bar. This roller may be smooth or fluted longitudinally or spirally, as may be deemed best for the work to be done. Being given a rapid rotation downward on the side next to the stalks, it helps to keep the passage clear of blades, broken stalks, and other rubbish, and also aids in passing the stalks along the passage.

While recommending the employment of roller F as the resistant member opposite the stripper-bar C, I do not regard it as indispensable to the success of my stripping mechanism, as a chain could be drawn along in the place now occupied by said roller, or the guide-board G' be extended downward to such place, either of which would form a resistant member to hold the stalks in operative contact with the stripper-bar.

At the rear end of the stalk-passage is placed the short roller F' on the same side of the stalk-passage as the stripper-bar C. This roller F', coacting with roller F, operates to keep the stalk-passage free from clogging with rubbish and to strip such ears from their stalks as may have escaped the action of the stripper-bar. The rear ends of these rollers are supported on the usual journal-bearings and the front ends by the intra-pivotal bearings $F^5$, which offer no hinderance to the entrance of the stalks into the stalk-passage.

The stripping mechanism of the machine herein described consists, substantially, of the endwise-reciprocating stripper-bar C and the guide-plates $C^4$ and $C^5$ on one side of the stalk-passage and a resistant member on the other side. These guide-plates may be a continuous piece and serve the double purpose of holding the stripper-bar in operative position and to act as a stationary stripping device at the ends of the stalk-passage when the stripper-bar C is at the opposite end of its stroke.

I prefer to fasten the tongues on the outside of the machine and have both horses walk between them instead of outside of a divided tongue, as is usual in corn-harvesters. When the tongues are attached to the machine in this manner, they offer less resistance to leaning and down stalks being brought into the stripping mechanism than when they are attached to the machine nearer the stalk-passage, and hence the machine will operate better with the construction here shown.

In operation my machine is adjusted to the height from the ground desired by the tilting lever and is drawn along the row to be gathered, the team walking astride the same row. I prefer to have the stripping mechanism incline upward at an angle of about forty-five degrees, the forward end being near to the ground and the rear end high enough that the ears can be gathered without breaking down the stalks. The stalks are gathered into the stripping mechanism by the rods O O, toothed chain D, and wheel $E^2$. Chain D is given such speed that it will hold the stalks erect while the machine moves forward, and is held in operative position by the guide $D^3$ and wheel $E^3$. Stripper-bar C is given a rapid endwise-reciprocating movement, by which the teeth, being hooked backward, are caused to take hold of the ears or their stems and jerk them from the stalks, when they are conveyed upward along the chute of the stalk-passage formed by the side-boards G G' to a receptacle to be provided to receive them.

I have heretofore described the stripper-bar C as having upwardly-projecting teeth when in operating position on the side of the stalk-passage. This is correct when the stalks are stripped of their ears while standing erect and is a convenient form of describing this part of my mechanism; but it would be always correct, in a general way, to describe the teeth of the stripper-bar as projecting in the direction of the tops of the stalks being operated upon, which would imply that they would project upward when the stalks stood erect and horizontally when the stripping mechanism was adapted to operate upon the stalks in a horizontal position—that is, the teeth will always extend about parallel with the side of the stalk having a resistant member on the other side.

I have shown my stripping mechanism applied to a machine having a longitudinal stalk-passage which permits the stalk to remain substantially erect while the ears are being pulled from them. While preferring this plan of construction, my stripping mechanism can be applied to any of the other plans of handling the stalks while stripping the ears from them, the only condition of success being that the teeth of the stripper-bar shall project lengthwise of the stalks in the stalk-passage and have a resistant member on the opposite side of the stalk-passage to hold the stalks in operating contact with said stripper-bar.

I do not wish to confine myself to the exact construction herein described, as various modifications can be made without going outside of the scope of my invention.

What I claim as my invention, and desire to secure by Letters Patent, is—

1. In a corn-harvester having a longitudinal stalk-passage, the combination of an endwise-reciprocating stripper-bar having upwardly-projecting teeth secured on one side of the stalk-passage, a roller placed on the same side at the delivery end of the stripper-bar, a roller on the opposite side of the stalk-passage to hold the stalks in operating contact with the stripper-bar and its abutting roller, and a gathering-chain adapted to elevate the ears along the stalk-passage, with means for their joint operation, substantially as set forth.

2. In a corn-harvester having a longitudinal stalk-passage, the combination of an endwise-reciprocating stripper-bar having upwardly-projecting teeth placed on one side of the stalk-passage, a roller placed on the opposite side of the stalk-passage, and a gathering-chain adapted to elevate the ears broken from the stalks along the stalk-passage, with means for their joint operation, substantially as specified.

3. In a corn-harvester having a longitudinal stalk-passage, the combination of an endwise-reciprocating stripper-bar having upwardly-projecting teeth placed on one side of the stalk-passage and a roller placed on the opposite side of the stalk-passage, adapted to hold the stalks in operating contact with said stripper-bar, with means for their joint operation, substantially as set forth.

4. In a corn-harvester having a longitudinal stalk-passage, the combination of an endwise-reciprocating stripper-bar having upwardly-projecting teeth placed on one side of the stalk-passage and a resistant part placed on the opposite side of the stalk-passage, which shall hold the stalks in operating contact with said stripper, with means for operating the same, substantially as specified.

5. In a corn-harvester having a longitudinal stalk-passage, the combination of an endwise-reciprocating stripper-bar having upwardly-projecting teeth placed on one side of the stalk-passage, a resistant part placed on the opposite side of the stalk-passage and adapted to hold the stalks in operating contact with the said stripper-bar, and a gathering-chain adapted to elevate the ears along the stalk-passage, with means for their joint operation, substantially as described.

6. In a corn-harvester having a stalk-passage, the combination of an endwise-reciprocating stripper-bar having teeth projecting lengthwise of the stalks in said stalk-passage, placed on one side of said stalk-passage, and a resistant part placed on the opposite side of said stalk-passage, adapted to hold the stalks in operating contact with the stripper-bar, with means to operate the same, substantially as specified.

7. In a corn-harvester having a longitudinal stalk-passage, the combination of an endwise-reciprocating stripper-bar having upwardly-projecting teeth placed on one side of the stalk-passage, with a stationary stripping guide-plate to aid said bar at the end thereof, and a resistant part on the opposite side of the stalk-passage, adapted to hold the stalks in operating contact with said stripping mechanism, substantially as set forth.

8. In a corn-harvester having a longitudinal stalk-passage, the combination of two inclined side-boards having guide-cleats thereon, forming a chute along said passage, a stripping mechanism adapted to take the ears from the stalks, and a gathering-chain adapted to elevate the ears along the stalk-passage, with means for their joint operation, substantially as set forth.

9. In a corn-harvester having a longitudinal stalk-passage, the combination of an endwise-reciprocating stripper-bar placed on one side of the stalk-passage and a side-board on the opposite side of the stalk-passage, having a nearly-vertical elevation, whereby the stalks and the ears are held in operative contact with the stripper-bar and the ears stripped from their stalks, substantially as specified.

10. In a corn-harvester having a stalk-passage, the combination of a roller placed on one side of said stalk-passage, its forward end supported on an intra-pivotal bearing, whereby the bearing offers no dead-surface along said stalk-passage to obstruct the entrance of the stalks, and a coacting part on the opposite side of said stalk-passage, the whole operating substantially as and for the purpose set forth.

11. In a corn-harvester having a longitudinal stalk-passage, the combination of a roller placed on one side of said stalk-passage and a shorter roller placed on the opposite side and rear end of said stalk-passage, both of said rollers provided with intra-pivotal bearings for supporting their forward ends, whereby said bearings shall offer no dead-surface to obstruct the incoming stalks, with means for operating said rollers, substantially as and for the purposes set forth.

WILLIAM WORTH BURSON.

Witnesses:
JOHN F. BUHMANN,
CARL F. SCHULDT.